Nov. 30, 1926.

W. F. FRIEDMAN

ALPHABETICAL CHART

Filed Jan. 7, 1926   4 Sheets-Sheet 1

1,608,590

Inventor
William F. Friedman

By Frank N. Harmon
Attorney

Nov. 30, 1926.

W. F. FRIEDMAN 1,608,590

ALPHABETICAL CHART

Filed Jan. 7, 1926   4 Sheets-Sheet 3

Fig. 3

Fig. 4

Inventor
William F. Friedman
By Frank H. Harmon
Attorney

Nov. 30, 1926.

W. F. FRIEDMAN

ALPHABETICAL CHART

Filed Jan. 7, 1926    4 Sheets-Sheet 4

1,608,590

Inventor
William F. Friedman

By Frank H. Harmon
Attorney

Patented Nov. 30, 1926.

1,608,590

UNITED STATES PATENT OFFICE.

WILLIAM F. FRIEDMAN, OF WASHINGTON, DISTRICT OF COLUMBIA.

ALPHABETICAL CHART.

Application filed January 7, 1926. Serial No. 79,774.

This invention relates to improvements in means for preparing and constructing symbols for use as identification symbols to designate or distinguish any member of a class of objects from other members in the class.

A further object of the invention is to facilitate the construction of identification symbols of such a nature that they may be recognized more speedily, remembered more easily, and erroneously indicated less easily, than is the case at present.

A further object of the invention is to provide means for the scientific construction of the identification symbols for the purposes above specified, and to provide charts and a method for using the charts in this construction in order to simplify the production of the symbols.

In order that the invention and its mode of application may be readily understood by persons skilled in the art, I have, in the accompanying illustrative drawings and in the detailed following description based thereon, set forth several embodiments of the same.

Figure 1:
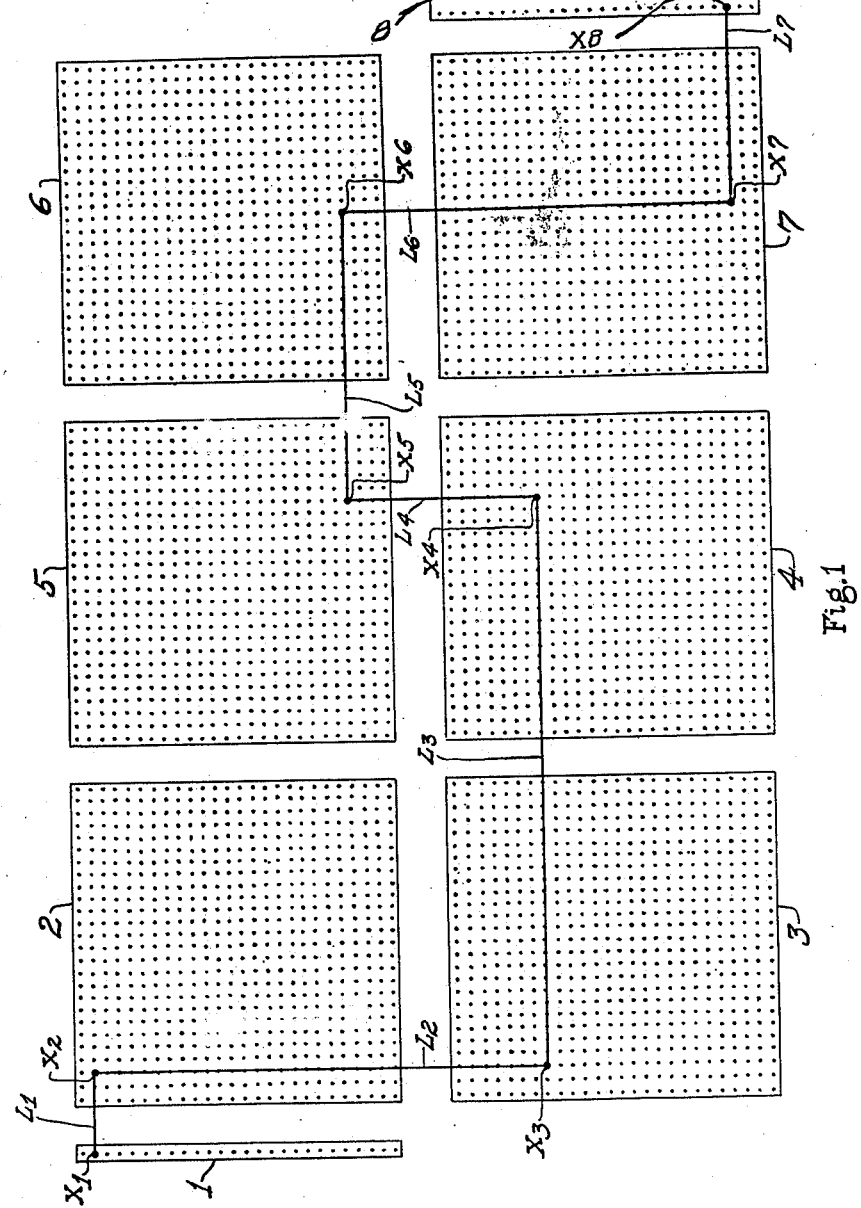
Figure 2:
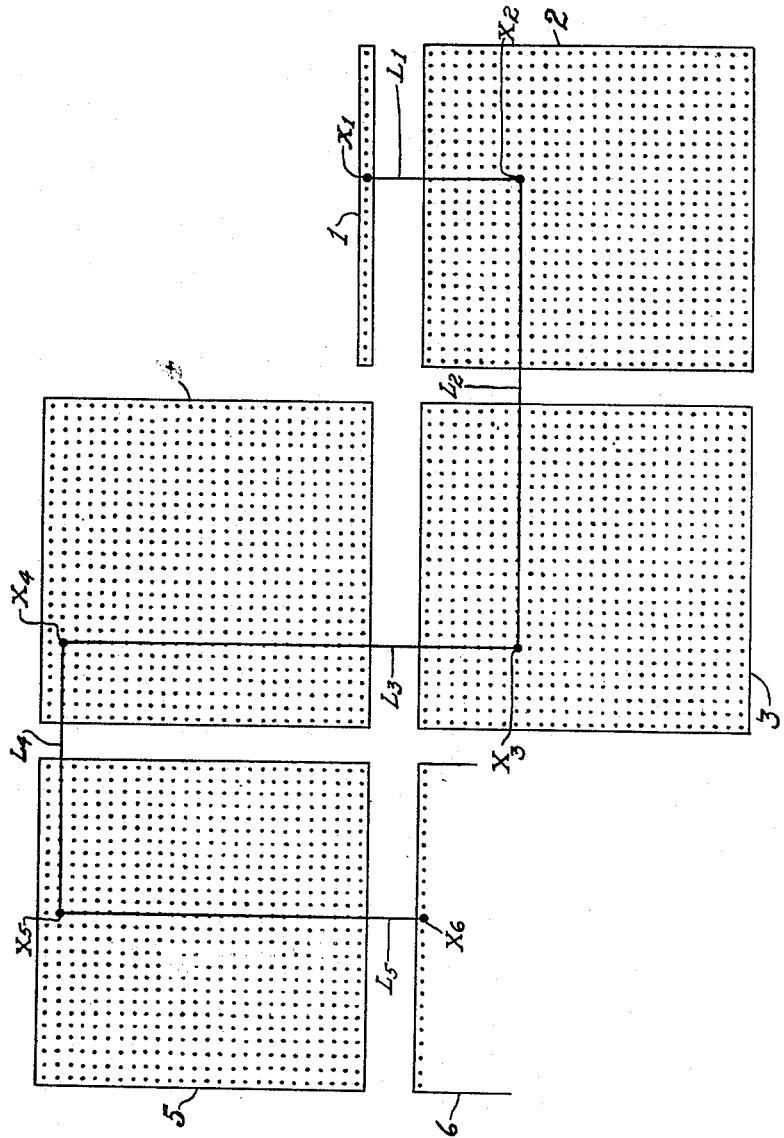
Figure 6:
Figure 5:
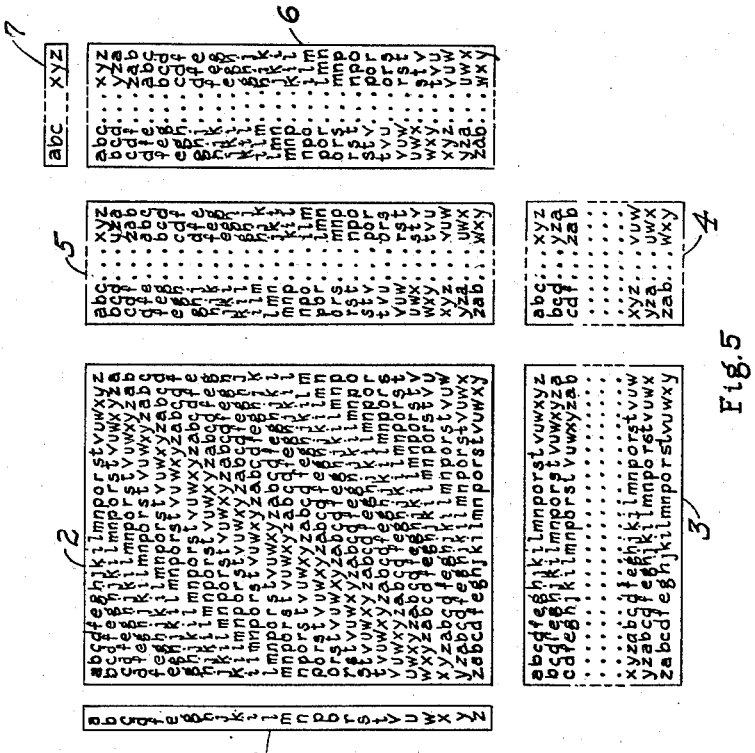

In these drawings Figure 1 is a basic chart or table for constructing the identification symbols in a systematic manner. Figure 2 shows how Figure 1 is susceptible of modification in minor respects without departing from the basic principles of the invention. Figures 3, 4 and 5 are intended to exemplify the application of the basic principles inherent in Figure 1. Fig. 6 is a sketch of an automobile identification tag as an instance of the practical use of the chart, from which the combination of letters was actually compiled.

The fundamental principle of my invention consists in providing means, consisting of a chart or sets of charts and a method by the use of which identification symbols consisting of groups of letters or of groups of figures or of groups of letters and figures can be constructed in a systematic and scientific manner so that the symbols thus produced will have certain characteristics to be described subsequently. I am, of course, well aware of the fact that charts somewhat similar in form and general nature are in use in connection with telegraph and cable codes, but I believe that I am the first person who has investigated the possibilities of applying these principles to animate or inanimate objects other than words and phrases, to construct charts suitable for the purpose, and to devise methods for the use of such charts.

The advantages of grouped-letter symbols for use in all types of identification or distinguishing symbols will become apparent upon consideration, and I will choose as an illustrative example the application of my identification symbols to motor vehicle identification systems of today.

There exists at present no real method or scientific system of constructing distinguishing symbols for motor vehicle identification tags, the symbols almost invariably consisting of groups of digits running in mere numerical sequence. In certain States where motor vehicles are exceedingly numerous, the identification tags bear symbols composed of as many as seven digits, a number often beyond the ability of the average person to read quickly and to remember for more than a few minutes. Furthermore, the symbols of the identification tags at present differ from each other in but one digit, thus making the chances for error very great and reducing the chances for detecting or correcting errors and apprehending or intercepting motor vehicles to an almost negligible quantity. Furthermore, as the symbols at present are constituted, even if each is remembered correctly, unless their exact order in the group is also remembered correctly, corrections cannot be made and identification is practically impossible. The difficulties experienced by police and traffic authorities throughout the country in their attempts to reduce the ever increasing number of fatalities and casualities cause directly or indirectly by motor vehicles are in no small degree due to these inadequacies of the present systems of motor vehicle identification, which render the chances of detection and apprehension very slight.

It is obvious that the fact that there are 26 letters available for constructing permutations and combinations as against only 10 digits makes possible a far greater number of letter-symbols in groups of a given length than would be possible by using figure-symbols in groups of the same length. For example, with symbols consisting uniformly of five elements, there are only 100,000 different permutations possible if the 10 digits are used, as against 11,881,376 permutations if the 26 letters are used, the ratio being as $10^5$ is to $26^5$. The total number of different symbols of figures taken in groups of from one to five digits inclusive is only 111,110, as a against a total number of 12,356,630 different symbols of letters taken in groups of from one to five characters. If identification tags employing figure-symbols are continued to be employed, in certain of the more populous states there will soon come a time when tags with eight digits will be necessary. In some of them seven are essential, in fact, at this time, and New York State, having already recognized the difficulties occasioned by the long numbers, has just recently adopted a system wherein a single letter is combined with five or more digits. The difficulty in recognizing and remembering an arbitrary group of seven or eight figures or a conglomeration of figures and letters, when only a fleeting glance is possible is, of course, apparent. And the large number of symbols necessary requires that every one of the possible symbols be utilized.

Contrast this with the advantages that would result in this respect if identification tags of letter-symbols such as mine were used, instead of the present long figure designations. In the first place, the length of identification symbols can be materially reduced if they are composed of letters, for in order to obtain a series of 200,000 figure-groups, for example, groups of from one to six figures, inclusive, would have to be employed, whereas if letter-groups were employed, groups of from one to four letters inclusive would be more than sufficient by over 100%. In the second place, the maximum number of different groups that can be made up from letters being very much greater than the maximum number that can be made up from figures, a systematic selection is possible. For example, only identification groups which form pronounceable artificial "words" can be selected for use. Identification tags bearing such letter-symbols can be read and recognized more quickly and correctly remembered for a much longer time than can tags bearing figure-symbols of the same length. In the third place, the systematic construction of identification symbols, as based upon my charts and methods, makes possible the production of symbols which differ from each other by more than one letter and will not permit of transpositions, features which offer very great advantages from the point of view of ease not only in the detection and correction of errors but also in the interception and apprehension of violators of motor vehicle ordinances. Exactly what this means and how this comes about will be explained in due course.

Referring specifically to the figures, in Figure 1 is shown a basic or fundamental chart for constructing identification symbols of groups of letters. This chart consists of a plurality of inter-related sets of positions or points in two-dimensional space, hereinafter termed loci, or spaces occupiable by letters of the alphabet, these sets of loci being so disposed spatially as to permit of constructing a maximum number of permutations of groups of letters of the alphabet, the groups all being of the same length.

This chart shown in Figure 1 consists of eight sets of loci: an initial set, 1, six intermediate sets, 2, 3, 4, 5, 6, 7 and a final set, 8. The initial set consists of a maximum of 26 loci all falling within the same vertical line or ordinate; the intermediate sets each consist of a maximum of 676 loci distributed symmetrically along 26 ordinates and a similar number of abscissæ; the final set consists of a minimum of 26 loci all falling within the same vertical line. The eight sets are so disposed spatially within one plane so that horizontal and vertical lines passing through the loci of one set are either parallel or perpendicular to the ordinates and abscissæ of all other sets.

The loci in these sets are merely points or positions which may be occupied by letters of the alphabet. The manner in which the letters are inserted or distributed will be discussed later, but we will assume for the moment that letters have already been inserted in Figure 1. A generalized description of the method of using the chart for the purpose of constructing identification groups is to select a letter from the initial set of letters and to add subsequently thereto, and to each succeeding letter, letters from the other sets, consistently following a definite route through the sets, taking but one letter from each set and always progressing in definite ordinate and abscissa paths, every pair of sequent letters lying within the same straight line, the first and second letter of each set of three sequent letters lying in a straight line which is perpendicular to that in which the second and third letters of the same set lie. One such route made up of ordinate and abscissa paths is shown in Figure 1 by the lines $L_1$ to $L_7$, inclusive, which connect the eight loci designated by the letters $X_1$ to $X_8$. The line $L_1$ connects locus $X_1$ with locus $X_2$; the line $L_2$ connects locus $X_2$ with locus $X_3$; and line $L_1$ is perpendicular to line $L_2$. This relation subsists in the case of the lines connecting all the pairs of loci. Taking any set of three sequent loci, for example, $X_3$ $X_4$ $X_5$, the first two lie in the same straight line $L_3$ and the last two lie in another straight line $L_4$, the two lines $L_3$ and $L_4$ being perpendicular to each other.

Although Figure 1 shows eight sets of loci, this is intended only as an example, for charts with a greater or lesser number of sets are, of course, possible. Furthermore, the spatial arrangement of the sets therein shown is not the only one possible in order to provide a succession of horizontal and vertical paths of progress from the initial set to the final set. So long as the spatial arrangements between sets are such that alternations of horizontal and vertical paths are provided for, the fundamental condition for the construction of the identification symbols has been met. For example, in Figure 2 is shown another arrangement, employing only six sets of loci which are disposed in a manner somewhat different from that in Figure 1, but the basic principle is the same in both, viz; the sets are so distributed as to provide ordinate and abscissæ paths in successive alternations.

The procedure followed in building up the grouped-letter symbols, as described in general terms above, will permit of the construction of many different types of such symbols, and the system is so flexible that it becomes feasible and practicable to construct series of grouped-letter symbols having definite characteristics. For example, it is possible to restrict the construction so as to produce only identification symbols of a definite constitution as regards the arrangement of vowels and consonants; or to produce identification symbols which shall be different from each other by more than one letter, and so on. Thus, the basic table or chart is susceptible of a great many variations of arrangements and the particular form which any given chart designed for a specific purpose will take is dependent upon the number of identification symbols required in a given series and upon the particular type that may be desired, as regards their composition.

As a specific illustration of how the basic chart shown in Figures 1 and 2 are adaptable for a particular purpose, and once more returning to motor vehicle identification as an illustrative example, in Figure 3 there is presented a table specifically designed, for example, for constructing the identification symbols that would be necessary for the motor vehicle identification tags for a certain State or district with the requirement that the symbols must conform to the following specifications:

(1) That there be a minimum of 150,000 different identification symbols.

(2) That they all be of the same length or number of letters.

(3) That they all be pronounceable, and composed of not more than two syllables.

(4) That they all be of the same type as regards the order or arrangement of their vowels and consonants.

(5) That they all differ from one another by at least two letters, and (6) That the transposition of a pair of adjacent or alternate letters in a bona fide identification symbol must not result in producing another bona fide identification symbol of the same series.

The chart shown as Figure 3 has been designed to permit of constructing the required series of symbols. In this figure only certain of the loci in each set are occupied by letters. In sets 1 and 6 are inserted but 19 consonants; in sets 2 and 5 are inserted 95 vowels in a symmetrical fashion; in sets 3 and 4 are inserted 361 consonants in a symmetrical fashion. (The letter Y is considered to be a consonant for the purposes of this special illustration, though it may act as a vowel in other cases, as may be desirable or necessary.)

The exact method of employing the illustrative table or chart shown in Figure 3 is as follows: beginning with any letter in set 1, the letter M, for example, one then proceeds to the right to set 2 and adds any one of the letters of that set and on the same horizontal line or extended abscissa with the letter M of set 1. Let it be the letter O, yielding the pair of letters MO. One then proceeds downward along the vertical column or extended ordinate from which the second letters, O, was taken, and moves into set 3, taking one of the letters in that column of set 3. Let it be S, yielding the syllable MOS. One then proceeds straight across to the right into set 4 and along the same horizontal line or extended abscissa from which the last letter, S, was taken from set 3, and adds a letter from that line in set 4. Let it be the letter T, yielding the group MOST. One then proceeds upward along the same vertical column or extended ordinate from which the last letter, T, was taken and entering set 5, adds a letter from that column. Let it be the letter E, thus yielding the group MOSTE. One finally proceeds straight across to the right along the line from which the last letter, E, was taken, into set 6, adding the letter shown at the right hand extremity of the line. This last letter is L, yielding the complete symbol MOSTEL. One invariably takes but a single letter from each set; and invariably the sequence of additions to the group is made by taking a letter which is in the same extended ordinate or extended abscissa from which the preceding letter was taken from the preceding set; thus, adjacent or contiguous letters in a symbol come from the same ordinate or abscissæ extended but alternate letters come from parallel and non-coincident ordinates or abscissæ. The identification symbol MOSTEL is but one of the 171,475 identification symbols afforded by Figure 3. For example, the identification symbols given below are only a few of the large series that may be produced by following the route described:

| MOSTAK | TOSTAR | JASTAK |
| MOSTEL | VOSTAS | KESTAK |
| MOSTIM | WOSTAT | LISTAK |
| MOSTON | YOSTAV | NUSTAK |
| MOSTUP | ZOSTAW | etc. |

The 171,475 identification symbols afforded by Figure 3 will conform to the specifications set forth above. There are more than a sufficient number of different ones to permit of eliminating undesirable ones, or such as by coincidence form real words with objectionable connotations or meanings and still leave the required 150,000 identification symbols; they are all of the same length, or number of letters; they are all easily pronounceable and are composed of but two syllables each; they are all of the same type as regards their composition or arrangement of vowels and consonants; they are all different from each other by at least two letters; and if carefully examined it will be found that the transposition of a pair of adjacent or alternate letters in any bona fide identification symbol of this series will not result in producing another bona fide symbol in the series. To explain exactly what is meant by the last specification, consider the identification symbol MOSTEL, which is a bona fide one, that is, it is one that is actually produced from the chart. The following transpositions of adjacent or alternate letters are possible:

| OMSTEL | MOSETL | MTSOEL |
| MSOTEL | MOSTLE | MOETSL |
| MOTSEL | SOMTEL | MOSLET |

None of these identification symbols are bona fide, that is, none of them are actually members of the same series as that to which MOSTEL belongs, because they cannot be produced from the chart given in Figure 3 by following the prescribed route of construction.

A few words in connection with some of the fundamental features of the illustrative chart shown in Figure 3 may be advisable. The real substance and purpose of such a chart is, of course, merely to facilitate and to systematize the construction of permutations of the letters of the alphabet, taken in groups of definite length. In the initial set of letters, 1, no letters are repeated, and the same holds true with respect to the final set, 6, but in the intermediate sets each letter is repeated as many times as there are different letters in the set. It is this condition which makes possible the two-letter difference feature in the identification groups produced from this table. If either the initial set or the final set contained more than a single line of non-repeated letters, then the strict minimum two-letter difference feature would be suppressed. For example, if the final set, 6, contained an additional column of letters so placed that each horizontal line of set 6 contained two different letters, then the total number of possible identification symbols would immediately be doubled but there would in reality be two series of groups; within each series there would be a strict minimum two-letter difference, but between the two series there would be a minimum of only a one-letter difference. An example of such a modified chart will be discussed later in connection with Figure 4. It is immaterial whether the final set be the one which contains more than one series, or the initial set. The ultimate results would be practically the same.

Having described Figure 3 and how it is used, let us proceed to examine in detail the advantages issuing from the employment of identification symbols such as the one thereby produced. This can best be done by means of a concrete example, as before, the motor vehicle.

Consider the case with motor vehicle identification tags bearing figure-symbols. Let us suppose that Mr. A is a bystander in a motor accident resulting in serious injury or death to a pedestrian and that the offending vehicle, which had identification tags bearing the number 278–814 departs from the scene at such a speed that Mr. A fails to obtain a sufficient opportunity to take careful note of the number on the identification tag of the speeding motorist. Mr. A, however, makes a report that the tag bore the number 273–814, that being as accurately as he could visualize and remember it. The authorities, taking the reported number, find that it applies to a Mr. B, but the latter on being apprehended and questioned proves his innocence. It becomes apparent only then that the number reported by Mr. A was not correct. Attempts to determine the correct number would necessitate the examination of scores of motorists, because the error might be in any one of the six figures or Mr. A might have added or dropped a figure and in every case each one of the ten digits would have to be tried as a possibility. For example, assuming that the first figure might be in error, the motorists to whom the following identification tags had been issued would have to be examined:

| 073–814 | 373–814 | 673–814 |
| 173–814 | 473–814 | 773–814 |
| 273–814 | 573–814 | 873–814 |
|         |         | 973–814 |

In fact, assuming that Mr. A visualized the length of group correctly but made an error in only one figure, a total of 60 suspects would have to be examined, and each would be put under the necessity of giving an account of his whereabouts and activities at such and such a time and place. Much valuable time is usually lost in such an investigation.

If, however, identification symbols of the type produced by my charts were employed for motor vehicle identification tags, the difficulty would be straightened out in a very much shorter period of time. I will assume now that the identification symbols given by Figure 3, were in use in the locality in which the accident reported took place, and further, that the offending vehicle bore identification tags with the symbol MOSTEL. In the first place, knowing that all the identification symbols in his locality were composed of six letter groups, Mr. A would be very unlikely to report a group containing an erroneous number of letters; and if he were an intelligent citizen he would also know that he must report a group whose composition or arrangement of vowels and consonants is correct, viz, consonant—vowel—consonant—consonant — vowel — consonant, in the form of a two syllable, pronounceable word. Suppose he does note all this, but he makes an error in one letter reporting the group as MORTEL instead of MOSTEL. Now the registration records would show no such an identification symbol as belonging to the service and at once would indicate the presence of an error. Mr. B, who was the first suspect in the foregoing case, would be spared the humiliation of establishing his innocence. The authorities would at once proceed to refer to the chart, Figure 3, and would determine where the error lay. Only six possibilities are to be investigated; they are as follows:

MORTEL
Assuming 1st letter in error___—O R T E L
Assuming 2nd letter in error___M—R T E L
Assuming 3rd letter in error___M O—T E L
Assuming 4th letter in error___M O R—E L
Assuming 5th letter in error___M O R T—L
Assuming 6th letter in error___M O R T E—

The chart would then be consulted to determine what the correct letter should be under each hypothesis. For example, the first hypothesis, viz, that concerning the group —ORTEL, would be tested out by following the construction route described above, but in the reverse direction, beginning with the letter L in set F, and going backward along the various ordinates and abscisses concerned in each set to the letter O in set B. The letter which is at the left hand extremity of the ordinate thus determined is L, yielding the possible identification symbol LORTEL. For the second hypothesis, viz, that concerning the group M—RTEL, the letter in set B which lies at the intersection of the ordinate determined by the position of M in set A and that abscissa in set B which is determined by the position of the letter R in set C, the letter T in set D, and the letter E in set E, and the letter L in set F, gives the letter U, thus yielding the possible identification symbol MURTEL. The procedure has been sufficiently indicated to make clear how the rest of the possibilities would be examined, and it would be found that the six identification symbols made possible, assuming a single-letter error are as follows:

MORTEL
Assuming 1st letter in error___—O R T E L gives L O R T E L
Assuming 2nd letter in error___M—R T E L gives M U R T E L
Assuming 3rd letter in error___M O—T E L gives M O S T E L
Assuming 4th letter in error—M O R—E L gives M O R S E L
Assuming 5th letter in error___M O R T—L gives M O R T A L
Assuming 6th letter in error___M O R T E— gives M O R T E M Among these it will be noted, is the correct identification symbol, that is the one which should have been reported, namely, MOSTEL. In all, only six persons, in whose names the motor vehicles bearing the foregoing six identification symbols were registered would have to be examined in order to determine which one of them was the party for whom search was being made. The speed with which such correction could be accomplished would very materially increase the chances of finding the guilty motorist, or of intercepting and apprehending him if he is trying to escape. The word flashed to police authorities to intercept any vehicle bearing one of the foregoing six identification symbols would be apt to produce speedier results than could possibly be the case under the present system of figure symbols. Furthermore, the ease and speed with which the police and traffic officers could read and recognize such "word" symbols on motor vehicle identification tags as against random conglomerations of figures is an advantage whose worth is apparent without further discussion.

When errors involving two elements are considered, the advantages of the identification symbols of letters over those of figures become still more apparent, the number of suspects to be examined in the former case being very much smaller than in the latter case. For example, a very frequent error in reporting symbols consists in transposing a pair of elements, both of which are correct. Thus Mr. A might report the number 278-814 as 287,814, and thus cause endless difficulties in correcting the error and apprehending the guilty motorist. But in the case of the identification symbol MOSTEL, transposition into MSOTEL at once yields an unpronounceable combination and one that almost in itself indicates where the error lies.

A strict adherence to the form of chart illustrated in Figure 3, or to the principle of the two-letter difference between identification symbols is, of course, not a necessary part of my invention. The basic chart of Figure 1 permits of wide variations. For example, in Figure 4, I show another illustrative chart, by means of which a series of 2,572,125 identification symbols, can be constructed all of the same form, but there will be found in every case three identification symbols which differ from each other by but one letter. The three members of each such set, however, will differ from the three members of every other set by at least two letters. Here are a few examples of the identification symbols produceable from this table.

```
FEGACID  FEGACOF  KEGACIL
FEGACIF  FEGACOG  LEGACIM
FEGACIG  FEGACOH  TEGUCIM
```

Such a series of identification symbols would be more than sufficient for the motor vehicles of the State of New York, for example. It would be quite possible to divide the State into three sections so that the identification symbols of each section would all be different from each other by at least two letters, thus practically retaining all the advantages of this principle and yet have the entire series of 2,572,125 symbols of the same composition. In fact, by extension of the principles of my chart and invention, it would be possible to compile a single series of artificial, easily pronounced, short "words" sufficient for every motor vehicle in the United States; hence, if national or federal registration ever becomes a necessity, my system would meet all the requirements.

In the illustrative charts shown thus far, the identification symbols are all of the same form and composition as regards their vowel and consonant arrangements. This however, is by no means a necessary or unavoidable feature of the invention. Where a large number of symbols is essential, it is possible greatly to increase the number of groups possible to be produced from one table, merely by an extension of the basic principles. For example, in Figure 5, I show the outlines of another chart by means of which a multitude of artificial, pronounceable, two-letter difference words can be produced, by following the same method of procedure as hereinbefore described. The following symbols are merely a very few samples of the types of pronounceable identification groups, differing from each other by at least two letters, that can be constructed from Figure 5:

```
BEGARUC  NODCHEZ  VUZATOZ  THOCKEX
KODYPOC  RIVASOY  FYRZAYA  SCHULOC
ACAWEHA  LIADROB  PRAYROZ  OLUAMIZ
                            etc.
```

In Figure 6, is shown an example of an identification tag bearing a pronounceable artificial word, instead of a group of figures. The length and type of word herein illustrated is, of course, merely a sample chosen at random; words of greater or lesser length and of a different vowel—consonant construction are possible, as has been made clear in the foregoing exposition.

Turning now to other uses to which my system can be put for purposes of easy and scientific identification, I will point out but a few of many.

In every large organization, where thousands of persons are employed, duplication of the names of individuals occurs as a constant source of confusing errors. Consequently, some means of identification in addition to the personal name must be applied. In the U. S. Army, for example, every enlisted man, and every officer is assigned a distinguishing or serial number. Now the difficulties enumerated above with respect to motor vehicle identification tags apply here equally well. An error in a single digit practically destroys the identifying value of the serial number applied to one enlisted man in several hundred thousand. Where such serial numbers must be telegraphed the percentage of error is very high, and the cost of their transmission is excessive because each figure counts as one word, so that in sending a number such as 1,457,862 seven words would be charged for. Now if grouped-letter identifications were employed, as is easily possible with the system here presented, with the principle of the two-letter difference and the nontransposability feature incorporated, not only would the errors be greatly reduced in ordinary routine correspondence, filing, and so on, but the cost of telegraphic transmission would be greatly reduced, since on commercial, domestic lines each group of five letters in code language counts as but one word.

Furthermore, it would be possible to so allocate the identification symbols that the symbol itself would contain much information concerning the individual enlisted man. For example, the first letter could indicate the branch or arm of service, the second and third, his year of enlistment, and so on.

Another illustrated example taken also from the government service is that involving the now complicated method of designating the branch, purpose, appropriation and year on records pertaining to the expenditure of funds. Long designations such as SC–31–P–5205–A–4420–6 are frequently encountered in telegraphic correspondence, and a single error in a letter or figure causes much difficulty. My system of identification symbols could readily be applied so that all of the information contained in the foregoing conglomeration of figures and letters could be given in a single group of five or six letters, easily remembered, pronounceable, with the two-letter difference and nontransposability features included.

My system would also find innumerable applications in the commercial world, such as in equipment and storage, catalogs, automatic telephone directories, machinery parts designations, policy designations of insured persons, serial designations of all sorts and descriptions, and so on.

Although the identification symbols illustrated so far have been spoken of as consisting exclusively of letters, it is obvious that symbols consisting of figures, or of letters and figures can be constructed to incorporate certain of the advantages afforded by the invention, such as the principle of the two-element difference, and the nontransposability of elements. It is only necessary that the loci of Figure 1, for example, be occupied by certain characters in a specified manner, and that those characters be letters or figures or even arbitrary signs. The only advantage not included is that of pronounceability feature afforded by letter groups.

It is obvious that the general principles described herein may be embodied in many other organizations widely different from those illustrated without departing from the spirit of the invention as defined in the following claims.

1. A chart for constructing identification symbols, composed of an initial set of loci, a plurality of intermediate sets of loci, and a final set of loci, the total number of all sets corresponding with the number of elements in the identification symbols to be constructed, said loci being occupiable by the characters of which the identification symbols are to be constructed and being distributed symmetrically along parallel ordinates and abscissæ in each set, said sets of loci being disposed spatially in a plane so that when the ordinates of a central or pivot set of any three contiguous sets of loci are extended into the set of loci adjacent to and on an abscissa side of the said pivot set, the so extended ordinates will coincide with the ordinates of the said adjacent set of loci, and when the abscissæ of the said pivot set are extended into the set of loci adjacent to but on an ordinate side of the said pivot set, the so extended abscissæ will coincide with the abscissæ of the last-mentioned adjacent set.

2. A chart for constructing identification symbols composed of an initial rectangle, a plurality of intermediate rectangles, and a final rectangle in all of which said rectangles characters are distributed along parallel ordinates and abscissæ, the total number of rectangles corresponding with the number of elements in the identification symbols to be constructed, the said rectangles being disposed spatially in a plane so that when the ordinates of a central or pivot rectangle of any three contiguous rectangles are extended into the rectangle adjacent to and on an abscissa side of the said pivot rectangle the so extended ordinates will coincide with the ordinates of the said adjacent rectangle; and when the abscissæ of the said pivot rectangle are extended into the rectangle adjacent to but on an ordinate side of the said pivot rectangle, the so extended abscissæ will coincide with the abscissæ of the last-mentioned adjacent rectangle.

3. A chart for constructing identification symbols in the form of equal-length permutations of characters, the said chart being composed of an initial set of characters, a plurality of intermediate sets of characters, and a final set of characters, each of said permutations containing one character from the said initial set of characters, one character from each of the said intermediate sets of characters, and one character from the said final set of characters.

4. A chart for constructing identification symbols in the form of equal-length permutations of characters, the said chart being composed of an initial set of characters, a plurality of intermediate sets of characters, and a final set of pairs of characters, each of said permutations containing one character from the said initial set of characters, one character from each of the said intermediate sets of characters, and one character from the said final set of pairs of characters.

5. A chart for constructing identification symbols in the form of equal-length permutations of letters, the said chart being composed of an initial set of letters, a plurality of intermediate sets of letters, and a final set of letters, the said permutations constituting a series of identification symbols applicable to the said chart, all of the said permutations being pronounceable sequences of letters, each of the said permutations being distinguishable by at least two letters from all other permutations belonging to the said series of identification symbols.

In testimony whereof I affix my signature.

WILLIAM F. FRIEDMAN.